(12) United States Patent
Zhang et al.

(10) Patent No.: US 9,323,450 B2
(45) Date of Patent: Apr. 26, 2016

(54) TOUCH CONTROL TERMINAL AND METHOD AND DEVICE FOR UNLOCKING TOUCH CONTROL

(71) Applicant: TENCENT TECHNOLOGY (SHENZHEN) COMPANY LIMITED, Shenzhen (CN)

(72) Inventors: Zhijun Zhang, Shenzhen (CN); Jiayi Yan, Shenzhen (CN); Li Li, Shenzhen (CN); Yuxi Liu, Shenzhen (CN); Haibo Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/287,457

(22) Filed: May 27, 2014

(65) Prior Publication Data
US 2014/0267120 A1 Sep. 18, 2014

Related U.S. Application Data

(63) Continuation of application No. PCT/CN2013/073879, filed on Apr. 8, 2013.

(30) Foreign Application Priority Data

May 8, 2012 (CN) .......................... 2012 1 0139609

(51) Int. Cl.
*G06F 3/045* (2006.01)
*G06F 3/0488* (2013.01)
(Continued)

(52) U.S. Cl.
CPC ............ *G06F 3/0488* (2013.01); *G06F 3/0484* (2013.01); *G06F 3/04886* (2013.01); *G06F 21/36* (2013.01)

(58) Field of Classification Search
CPC ... G06F 3/0484; G06F 3/04886; G06F 21/36; G06F 3/0488; G05F 3/044
USPC .................................................... 345/173–178
See application file for complete search history.

(56) References Cited

U.S. PATENT DOCUMENTS

| 8,539,382 B2 * | 9/2013 | Lyon et al. ..................... 715/863 |
| 2005/0253817 A1 * | 11/2005 | Rytivaara et al. ............. 345/173 |
| 2007/0150842 A1 | 6/2007 | Chaudhri et al. |

(Continued)

FOREIGN PATENT DOCUMENTS

| CN | 101436113 A | 5/2009 |
| CN | 101697181 A | 4/2010 |

(Continued)

OTHER PUBLICATIONS

International Search Report issued in International Application No. PCT/CN2013/073879 dated Jul. 18, 2013.

(Continued)

*Primary Examiner* — Vijay Shankar
(74) *Attorney, Agent, or Firm* — Fitzpatrick, Cella, Harper & Scinto

(57) ABSTRACT

For unlocking touch control of a touch control terminal, it is detected if any unlock object is selected, then the selected unlock object is tracked to see if the selected unlock object has slid to any of a plurality of unlocking positions outside the corresponding locking zone. If positive, the touch control for a function corresponding to the selected unlock object is unlocked.

17 Claims, 9 Drawing Sheets

(51) Int. Cl.
*G06F 3/0484* (2013.01)
*G06F 21/36* (2013.01)

(56) References Cited

U.S. PATENT DOCUMENTS

| | | |
|---|---|---|
| 2009/0006991 A1 | 1/2009 | Lindberg et al. |
| 2010/0257490 A1 | 10/2010 | Lyon et al. |
| 2011/0316797 A1 | 12/2011 | Johansson |
| 2015/0163343 A1 | 6/2015 | Kim et al. |

FOREIGN PATENT DOCUMENTS

| | | |
|---|---|---|
| CN | 101866259 A | 10/2010 |
| EP | 2060970 A1 | 5/2009 |
| JP | 2009123208 A | 6/2009 |
| JP | 2009521753 A | 6/2009 |
| KR | 2010021007 A | 2/2010 |
| KR | 20110129574 A | 12/2011 |

OTHER PUBLICATIONS

International Preliminary Report on Patentability issued in corresponding International Application No. PCT/CN2013/073879 dated Nov. 11, 2014.

Korean Office Action issued in corresponding Korean Application No. 10-2014-7013765 dated May 11, 2015.

Japanese Office Action issued in corresponding Japanese Application No. 2014-541533 dated Jul. 28, 2015.

* cited by examiner

TOUCH CONTROL TERMINAL AND METHOD AND DEVICE FOR UNLOCKING TOUCH CONTROL

This application is a continuation of International Application No. PCT/CN2013/073879 filed on Apr. 8, 2013, which claims priority to Chinese Patent Application No. 201210139609.8 filed on May 8, 2012, the contents of which are incorporated by reference herein in their entirety.

FIELD OF THE INVENTION

The present invention relates to a touch control terminal, and more particularly to a touch control terminal having a touch-sensitive surface for touch control, wherein the touch control may be selectively locked and unlocked. The present invention also relates to a method and device for unlocking the touch control, and more particularly to a method and device for unlocking the touch control for a specified function of a touch control terminal.

BACKGROUND OF THE INVENTION

Nowadays, touch control techniques have become a mainstream in multimedia and communication industries. For security and power-saving purposes and to avoid unintentional triggering, touch control can be locked when a touch-sensitive display has been suspended from use for preset duration. Afterwards, the touch control can be recovered by an unlocking operation on the touch-sensitive display.

Current solutions for unlocking touch control of a touch screen terminal, e.g. a smart phone, are commonly implemented with a sliding gesture. FIG. 1A schematically illustrates unlocking means used in an Apple® iPhone 110, wherein the touch control can be unlocked by dragging an unlock image 111 along a channel 112 to the end of the channel 112, e.g. from left to right. FIG. 1B and FIG. 1C schematically illustrate examples of unlocking means used in mobile phones 120 and 130 for Android™. In the example shown in FIG. 1B, the touch control can be unlocked by dragging an unlock image 121 downwards to a specific position 122. In the example of FIG. 1C, the touch control can be unlocked by dragging a selected one of functional icons M, P and H to a specific position 132. While unlocking the touch control, a desired function corresponding to the function icon is also activated.

The above-mentioned unlocking means, even though implemented with different details, have a common algorithm for unlocking the touch control. That is, it is essential to drag an unlock image from a locking position A to an unlocking position X through a defined path P, as schematically illustrated in FIG. 1D. Due to confinement of the unlocking position X and the unlocking path P, the unlocking means is not user-friendly enough.

SUMMARY OF THE INVENTION

The present invention provides a method and device for unlocking touch control by way of a sliding gesture on a touch-sensitive surface of a touch control terminal, which are flexible and user-friendly in operation.

The present invention also provides a touch control terminal having a touch-sensitive surface for touch control, and the touch control may be selectively locked and unlocked in a flexible and user-friendly manner.

In one aspect, the present invention provides a method for unlocking touch control, performed by a touch control terminal. The touch control terminal has a touch-sensitive surface on which at least one unlock object and a locking zone corresponding to the at least one unlock object are defined. The method includes steps of:

detecting if any of the at least one unlock object is selected;
tracking the selected unlock object; and
unlocking the touch control for a function corresponding to the selected unlock object when the selected unlock object is located at any of a plurality of unlocking positions outside the corresponding locking zone.

In another aspect, the present invention provides a device for unlocking touch control of a touch control terminal. The device includes:

a correspondence-realizing unit configured to realize an unlock object and a locking zone, which correspond to a function to be unlocked;

a position-correlating unit configured to determine a position relationship between the unlock object and the locking zone, wherein the position relationship includes a first relationship that the unlock object is located inside a margin of the locking zone, a second relationship that the unlock object is located at the margin of the locking zone, and a third relationship that the unlock object is located outside the margin of the locking zone; and a touch-control-unlocking unit configured to unlock the touch control for a function corresponding to the unlock object if the position relationship between the unlock object and the locking zone meets the third relationship.

In a further aspect, the present invention provides a touch control terminal, which includes a touch-sensitive display and a device for unlocking touch control of the touch control terminal as recited above.

According to the present invention, after determining a position relationship between the unlock object and the locking zone, which is a first relationship that the unlock object is located inside a margin of the locking zone, a second relationship that the unlock object is located at the margin of the locking zone, or a third relationship that the unlock object is located outside the margin of the locking zone, it may be detected whether the position relationship meets the third relationship. The easy condition allows the slide-to-unlock operation to be conducted in any of a variety of directions. Therefore, touch control of a touch control terminal may be unlocked in a flexible and user-friendly manner.

BRIEF DESCRIPTION OF THE DRAWINGS

In order to describe the embodiments of the present invention more clearly, the accompanying drawings required for describing the embodiments are briefly introduced hereinafter. It is apparent that the accompanying drawings are only used for illustrating some of the embodiments of the present invention, and for those ordinarily skilled in the art, further drawings can be realized without additional inventive efforts.

DETAILED DESCRIPTION OF PREFERRED EMBODIMENTS

According to the present invention, at least one unlock object and at least one locking zone corresponding to the unlock object(s) are defined on a touch-sensitive surface of a touch control terminal, e.g. a smart phone, a portal media player, a tablet, a personal digital assistant, a personal computer, a laptop computer, a TV set, or any other electronic device executing touch control. In a locked state of the touch control terminal, a position of a selected unlock object relative to the locking zone is tracked. For example, selection of an unlock object is determined when it is touched by a user. If the selected unlock object is dragged to a position outside the locking zone, at least a function corresponding to the selected unlock object is unlocked. Otherwise, the touch control remains locked.

For illustrating the objectives, technical means and advantages of the present invention in a clear way, the present invention is described with reference to the drawings and embodiments. It is to be understood that the embodiments are used for illustrating the present invention rather than limiting the present invention. For example, the touch control terminals described hereinafter are touch screen terminals, each having a touch-sensitive display on which one or more unlock images and one or more locking zones corresponding to the unlock image(s) are defined. However, the touch-sensitive surface is not to be limited to a touch-sensitive display, but may be any other suitable surface for touch control purposes.

Embodiment 1

Figure 1A:
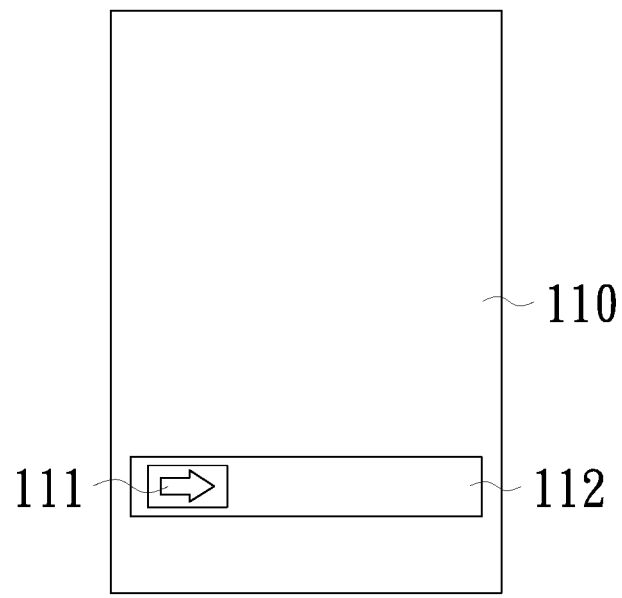
FIGS. 1A~1D are schematic diagrams illustrating different types of touch-sensitive displays of prior art mobile phones.
Figure 1B:
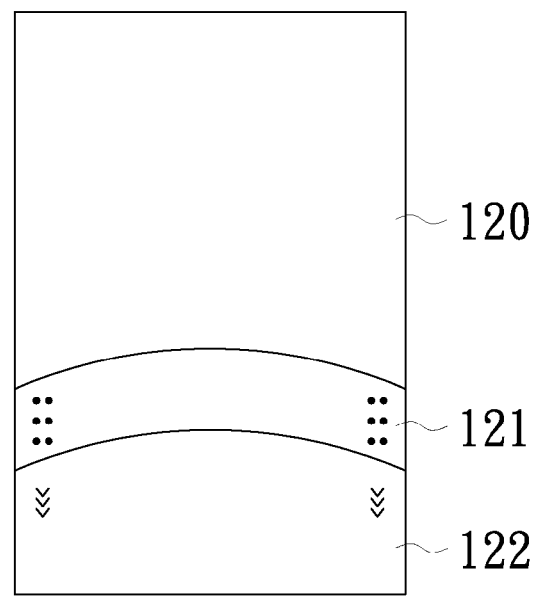
Figure 1C:
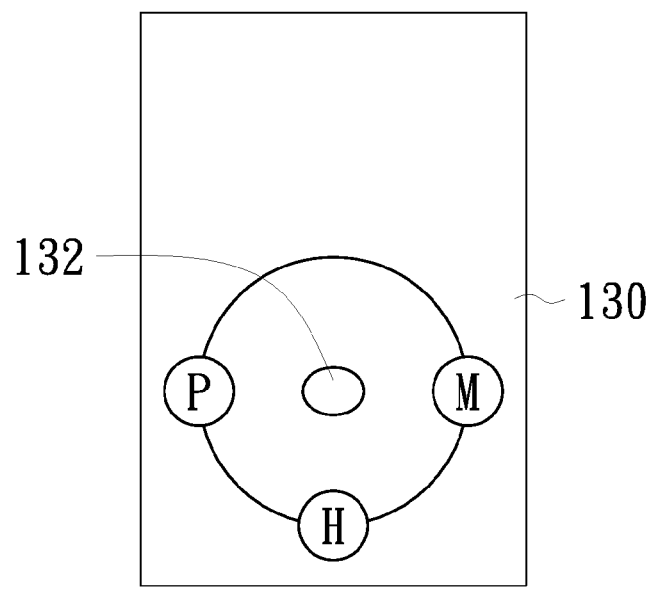
Figure 1D:
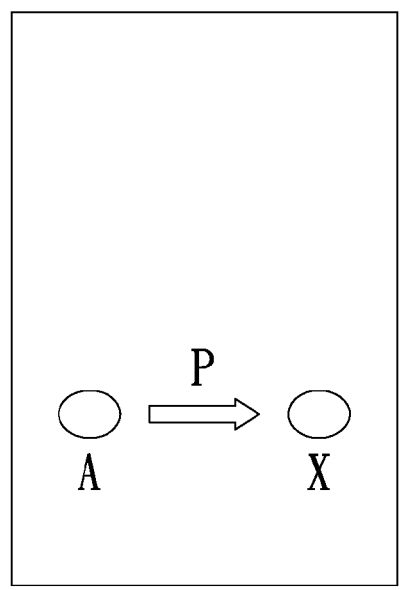
Figure 2:
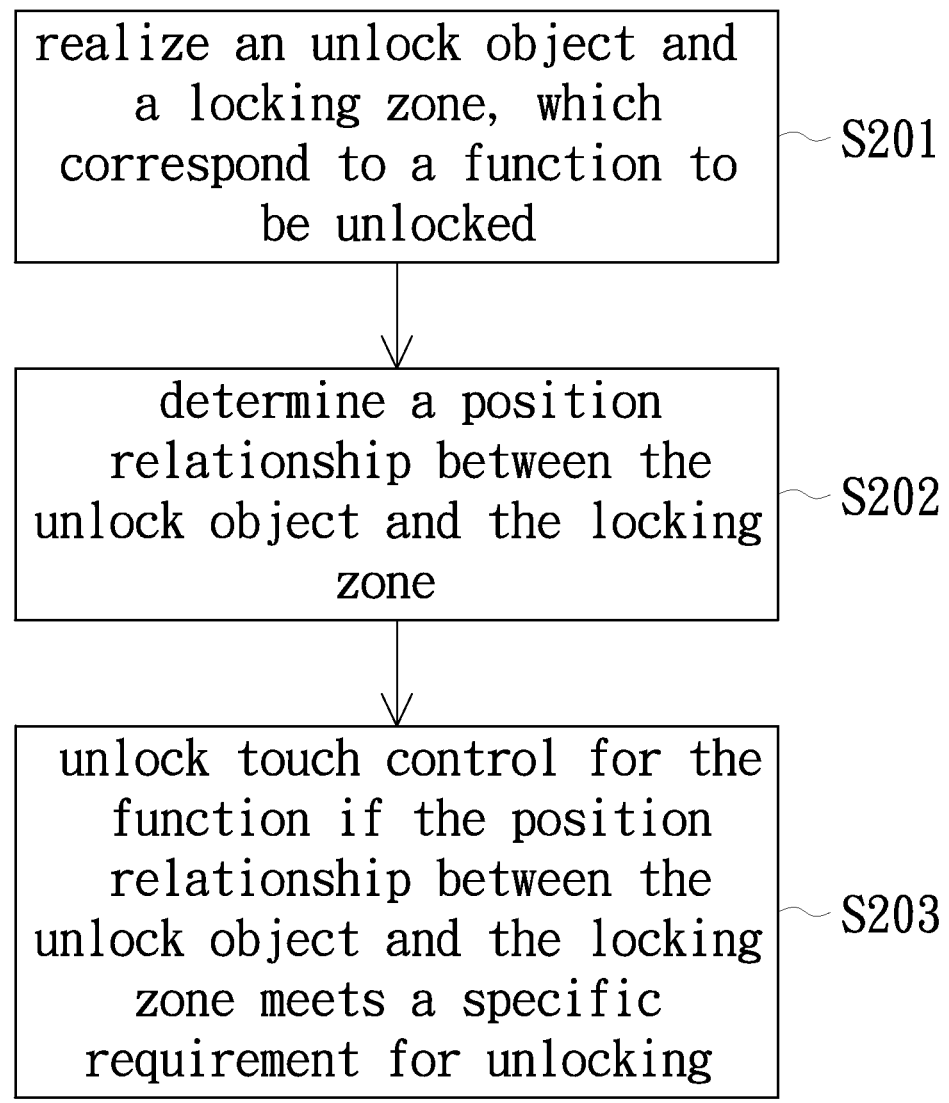
FIG. 2 is a flowchart of a method for unlocking touch control of a touch control terminal according to a first embodiment of the present invention.

A method according to embodiment 1 of the present invention is illustrated with reference to FIG. 2. The steps illustrated in the flowchart of FIG. 2 are executed after an unlock object is selected in response to a user's touch.

In Step S201, an unlock object and a locking zone, which correspond to a function to be unlocked, are realized. The function to be unlocked, for example, can be normal displaying of the touch-sensitive display, or execution of an application program in the touch control terminal. Different functions may be unlocked with the same or different unlock object(s) corresponding to the same or different locking zone. The association among the unlock object(s), the locking zone (s) and the functions has been preset in the touch control terminal, and shapes and sizes of the unlock object(s) and the locking zone(s) may be any suitable ones advantageous to a user's unlocking operation.

In an example that there are a plurality of unlock objects corresponding to a function to be unlocked, the method includes, before Step S201, the following steps: displaying the unlock objects corresponding to the function or functions in a locked state; after one of the unlock objects is selected in response to a user's touch, displaying the selected unlock object while hiding or idling the unselected unlock object(s); and displaying a locking zone which corresponds to the function to be unlocked and encloses the selected unlock object.

Take the normal displaying of the touch-sensitive display as an example of the function to be unlocked. Please refer to FIG. 3A. A plurality of unlock objects 301 may be predefined and simultaneously shown on the touch-sensitive display 300 in a locked state of the touch control terminal, and all the unlock objects 301 are enclosed within a same predefined locking zone 302, which is visibly shown on the touch-sensitive display 300 when one of the unlock objects 301 is selected. Alternatively, the unlock objects 301 may correspond to different locking zones 302, respectively. When one of the unlock objects 301 is selected, its corresponding locking zone is displayed with the selected unlock object 301 as a geometric center thereof. Meanwhile, the other unlock objects are hidden or idled to avoid activating any undesired operation, and improve efficiency of the unlocking operation. In the example illustrated in FIG. 3A, the locking zone 302 is rectangular. Alternatively, the locking zone 302 may be circular as shown in FIG. 3B or elliptic as shown in FIG. 3C.

In Step S202, a position relationship between the unlock object and the locking zone is determined, wherein the position relationship is one of a first relationship that the unlock object is located inside a margin of the locking zone, a second relationship that the unlock object is located at the margin of the locking zone, and a third relationship that the unlock object is located outside the margin of the locking zone.

In a specific embodiment, the following steps are executed:

fetching a position coordinate of a geometric center or specified edge point of the selected unlock object and position coordinates of the margin of the locking zone; and determining a position relationship between the selected unlock object and the locking zone according to the fetched position coordinates.

In another specific embodiment, the following steps are executed:

fetching a pixel coordinate of a geometric center or specified edge point of the selected unlock object and pixel coordinates of the margin of the locking zone; and determining a position relationship between the selected unlock object and the locking zone according to the fetched pixel coordinates.

The means described above can be preset depending on practical requirements. The position relationship between the selected unlock object and the locking zone is determined by comparing the position or pixel coordinate of the geometric center or specified edge point of the selected unlock object with the position or pixel coordinates of the margin of the locking zone, and the selected unlock object is detected to be outside the locking zone if the position relationship between the selected unlock object and the locking zone meets the third relationship.

In Step S203, if the position relationship between the unlock object and the locking zone meets the third relationship, i.e. the selected unlock object is moved outside the locking zone, touch control for the function is unlocked.

On the contrary, the function is kept locked if no unlock object is touched to be selected, the selected unlock object is not located outside the corresponding locking zone, or the touched and moved unlock object is not released.

Figure 3A:
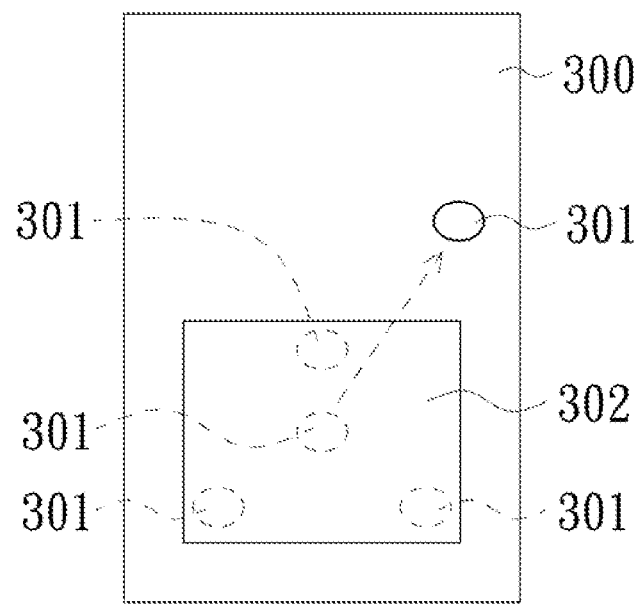
FIGS. 3A~3C are diagrams schematically illustrating a touch-sensitive display according to an embodiment of the present invention, on which examples of images for unlocking touch control are shown.
Figure 3B:
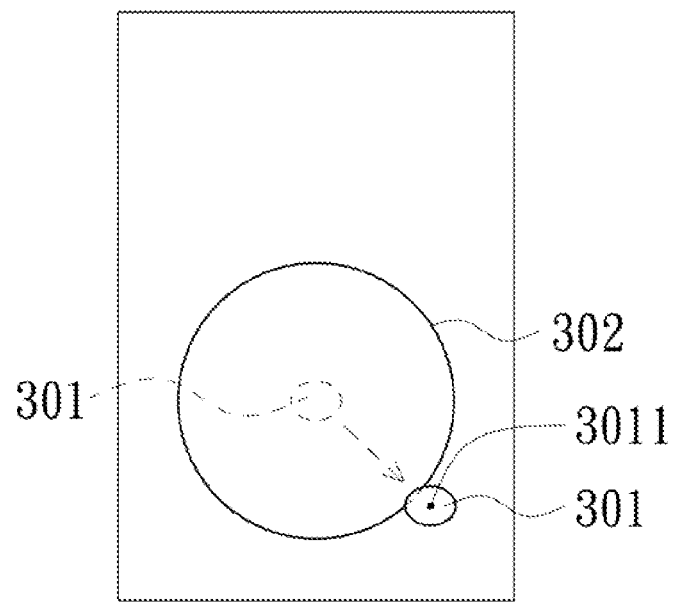
Figure 3C:
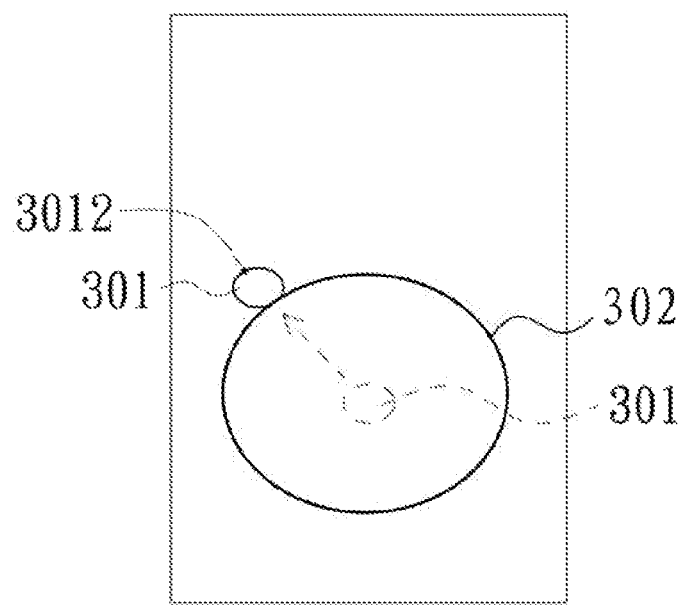

For example, when a user would like to activate a specified function of the touch control terminal, which is in a locked state, he may touch the unlock object 301 corresponding to the specified function, and move the selected unlock object 301 to any of positions in an unlocking zone outside the locking zone 302 by dragging the unlock object to the position outside the locking zone or touching the display at a desired position outside the locking zone, as indicated by a dashed arrow shown in any of FIGS. 3A~3C. In the example as shown in FIG. 3A, the entire unlock object 301 is moved outside the locking zone 302. In the example as shown in FIG. 3B, the geometric center of the unlock object 301 has been moved outside the locking zone 302 in spite that there is still a portion of the unlock object 301 inside the locking zone 302. In the example as shown in FIG. 3C, a specified edge point, e.g. a frontmost point along a moving path, of the unlock object 301 has been moved outside the locking zone 302 in spite that the unlock object 301 has not moved outside the locking zone 302 entirely. All the three examples may be examples of successful unlocking depending on the preset unlocking conditions as mentioned above. The unlocking operation may be implemented by, for example, calling an application programming interface (API) to enter an operational interface corresponding to the specified function.

In this embodiment, the position relationship can only be determined after the touched and dragged unlock object is released from the user's touch. In this way, the user may decide not to unlock touch control after an unlock object has been selected and moved, but not yet released by just moving it back inside the locking zone.

Embodiment 2

Figure 4:
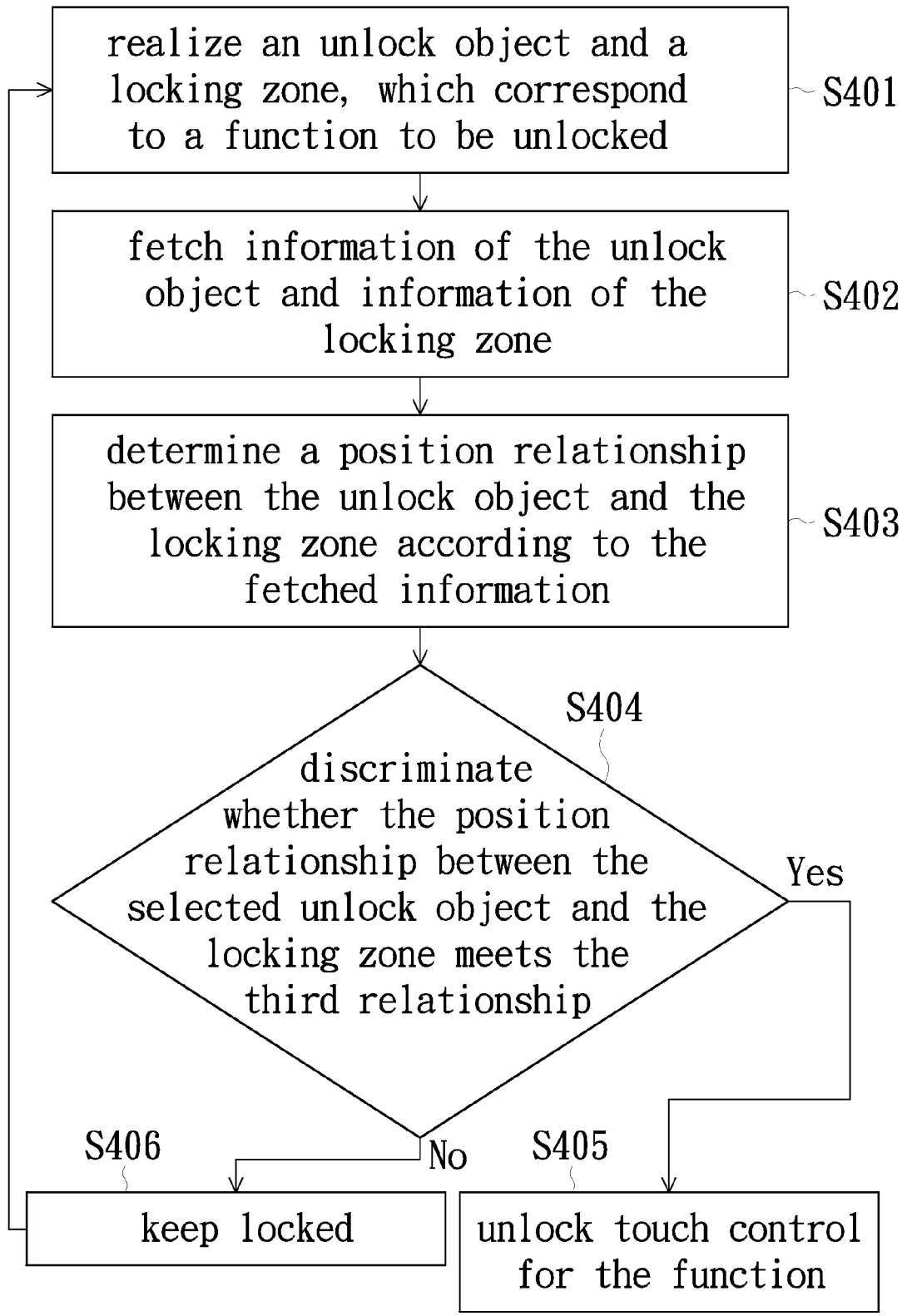
FIG. 4 is a flowchart of a method for unlocking touch control of a touch control terminal according to a second embodiment of the present invention.

Embodiment 2 of the present invention will be described hereinafter with reference to the flowchart of FIG. 4.

In Step S401, an unlock object and a locking zone, which correspond to a function to be unlocked, are realized. The function to be unlocked, for example, can be normal displaying of the touch-sensitive display, or execution of an application program in the touch control terminal. Different functions may be unlocked with the same or different unlock object(s) corresponding to the same or different locking zone. The association among the unlock object(s), the locking zone (s) and the functions has been preset in the touch control terminal, and shapes and sizes of the unlock object(s) and locking zone(s) may be any suitable ones advantageous to a user's unlocking operation.

In Step S402, information of the unlock object and information of the locking zone are fetched. The information of the elected unlock object is a position or pixel coordinate of a geometric center or specified edge point of the selected unlock object, and the information of the locking zone is position coordinates of a margin of the locking zone.

In Step S403, a position relationship between the unlock object and the locking zone is determined according to the fetched information. The position relationship is one of a first relationship that the unlock object is located inside the margin of the locking zone, a second relationship that the unlock object is located at the margin of the locking zone, and a third relationship that the unlock object is located outside the margin of the locking zone. The position relationship between the selected unlock object and the locking zone is determined by comparing the position or pixel coordinate of the geometric center or specified edge point of the selected unlock object with the position or pixel coordinates of the margin of the locking zone, and the selected unlock object is detected to be outside the locking zone if the position relationship between the selected unlock object and the locking zone meets the third relationship.

In Step S404, it is discriminated whether the position relationship between the selected unlock object and the locking zone meets the third relationship. If the position relationship meets the third relationship, the process proceeds to Step S405 to unlock the touch control for the specified function. Otherwise, the process proceeds to Step S406 to keep the touch control for the specified function or the entire touch control terminal locked.

For example, the function to be unlocked may be a message application program or a missed-call application program. Two unlock objects are predefined to correspond to the message application program, and another two unlock objects are predefined to correspond to the missed-call application program, wherein each of the unlock objects corresponds to and is enclosed by a specific locking zone. In a specific example, two unlock objects and two locking zones respectively corresponding to the two unlock objects are used for both the message application program and the missed-call application program. In the beginning, both the unlock objects are shown on the touch-sensitive display of the touch control terminal in a locked state. Then, one of the unlock objects is touched so as to be selected. Meanwhile, its corresponding locking zone is displayed with the selected unlock object as a geometric center thereof, and the other unlock object is hidden or idled to avoid activating any undesired operation, and improve efficiency of the unlocking operation. By moving the selected unlock object to a position outside the corresponding locking zone, as illustrated in FIGS. 3A~3C, the touch control for both the message application program and the missed-call application program is unlocked.

As described above, in Step S403, the position relationship between the selected unlock object and the locking zone is determined by comparing the position or pixel coordinate of the geometric center or specified edge point of the selected unlock object with the position or pixel coordinates of the margin of the locking zone. In a specific example, an absolute value of an abscissa and an absolute value of an ordinate of the unlock object are compared with an absolute value of a maximum one of abscissae and an absolute value of a maximum one of ordinates of the margin of the locking zone, respectively. If either of the absolute value of the abscissa and the absolute value of the ordinate of the unlock object is greater than the comparative one of the locking zone, it is determined that the unlock object is located outside the locking zone.

The examples and details of means mentioned in Embodiment 1 for unlocking touch control of the touch control terminal, as long as no conflict in operations and objectives exists, may be applied hereto, and are not to be redundantly described herein.

It is understood by those skilled in the art that some or all of the steps described above may be implemented with hardware devices instructed with associated programs. The programs may be stored in a storage media accessible by a computer. The storage media, for example, may be ROM/RAM, magnetic disc, optical disc, etc.

Embodiment 3

Embodiment 3 of the present invention will be described hereinafter with reference to the functional block diagram of FIG. 5. Please be noted that for focused discussion, only elements associated with the present invention are illustrated.

Figure 5:
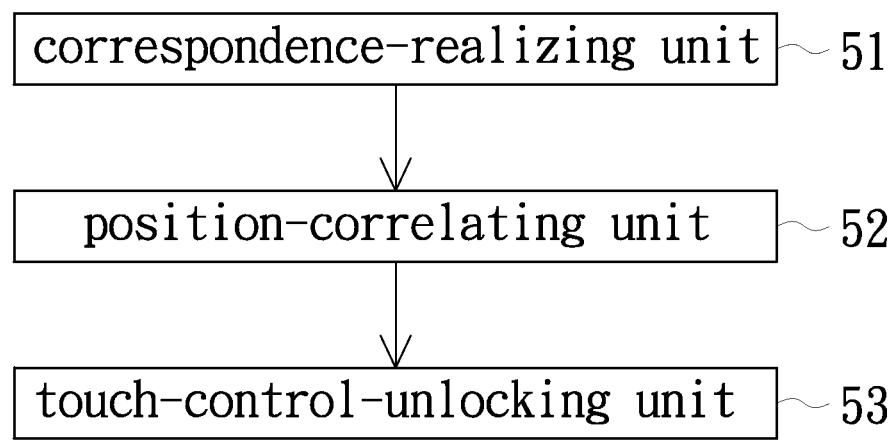
FIG. 5 is functional block diagram illustrating a device for unlocking touch control of a touch control terminal according to a third embodiment of the present invention.

The device as illustrated in FIG. 5 is adapted to be used for unlocking touch control of a smart phone, or any other touch control terminal having a touch-sensitive display such as a mobile phone or a tablet computer. The device according to this embodiment of the present invention includes a correspondence-realizing unit 51, a position-correlating unit 52 and a touch-control-unlocking unit 53, wherein:

the correspondence-realizing unit 51 realizes an unlock object and a locking zone, which correspond to a function to be unlocked;

the position-correlating unit 52 determines a position relationship between the unlock object and the locking zone, wherein the position relationship is one of a first relationship that the unlock object is located inside a margin of the locking zone, a second relationship that the unlock object is located at the margin of the locking zone, and a third relationship that the unlock object is located outside the margin of the locking zone; and the touch-control-unlocking unit 53 unlocks touch control for a function corresponding to the unlock object if the position relationship between the unlock object and the locking zone meets the third relationship.

Shapes and sizes of the unlock object and the locking zone may be preset as mentioned in any of the above embodiments and examples, and corresponding relationships therebetween may follow the ones exemplified above.

In a specific embodiment, the device for unlocking touch control further includes a defining unit for predefining one or more unlock objects and one or more locking zones for each function to be selectively unlocked. In addition, the device further includes:

an unlock-object-displaying unit displaying the one or more unlock objects corresponding to the function or functions in a locked state;

a state-setting unit, after one of the unlock objects is selected in response to a user's touch, hiding or idling the unselected unlock object(s); and a locking-zone-displaying unit displaying a locking zone which corresponds to the function to be unlocked and encloses the selected unlock object.

For example, the function to be unlocked is touch control for an application program which is in a locked state. For unlocking the application program, it is detected whether the unlock object or any of the unlock objects is touched by a user. If one unlock object is touched so as to be selected, a corresponding locking zone is displayed with the selected unlock object as a geometric center thereof. Of course, a shape, a size and a range of the locking zone may also be designed in other ways depending on practical requirements. Meanwhile, the unselected unblock object(s) will be hidden or idled. The unlocking operation may be implemented by, for example, calling an application programming interface (API) to enter an operational interface corresponding to the specified function.

In an embodiment, the device may further include a state-holding unit keeping the function locked if no unlock object is selected, the selected unlock object is not located outside the corresponding locking zone, or the selected unlock object is not released.

According to the present invention, a unlocking criterion is whether the selected unlock object is located at any of a plurality of unlocking positions outside the corresponding locking zone. There is provided a novel unlock solution, which compared to the existing unlock solution, is simpler and easier to be manipulated.

Embodiment 4

Embodiment 4 of the present invention will be described hereinafter with reference to the functional block diagram of FIG. 6. Please be noted that for focused discussion, only elements associated with the present invention are illustrated.

Figure 6:
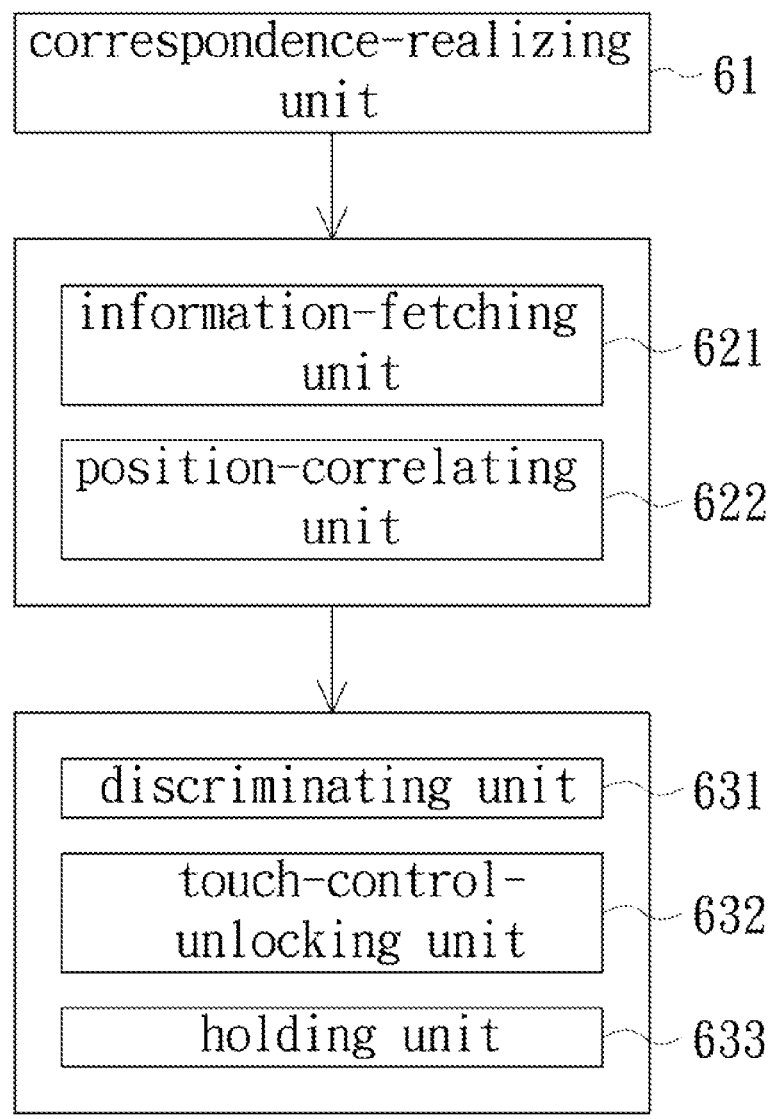
FIG. 6 is a block functional diagram illustrating a device for unlocking touch control of a touch control terminal according to a fourth embodiment of the present invention.

The device as illustrated in FIG. 6 is adapted to be used for unlocking touch control of a smart phone, or any other touch control terminal having a touch-sensitive display such as a mobile phone or a tablet computer. The device according to this embodiment of the present invention includes a correspondence-realizing unit 61, an information-fetching unit 621, a position-correlating unit 622, a discriminating 631, a touch-control-unlocking unit 632 and a holding unit 63.

The correspondence-realizing unit 61 realizes an unlock object and a locking zone, which correspond to a function to be unlocked. The function to be unlocked, for example, can be normal displaying of the touch-sensitive display, or execution of an application program in the touch control terminal. Different functions may be unlocked with the same or different unlock object(s) corresponding to the same or different locking zone. The association among the unlock object(s), the locking zone(s) and the functions has been preset in the touch control terminal, and shapes and sizes of the unlock object(s) and the locking zone(s) may be any suitable ones advantageous to a user's unlocking operation.

In a specific embodiment, the device for unlocking touch control further includes a defining unit for predefining one or more unlock objects and one or more locking zones for each function to be selectively unlocked before the correspondence between the unlock object and the locking zone is realized.

The information-fetching unit 621 fetches information of the locking zone and information of the selected unlock object. The information of the selected unlock object may be a position or pixel coordinate of a geometric center or specified edge point of the selected unlock object, and the information of the locking zone may be position coordinates of a margin of the locking zone.

The position-correlating unit 622 determines a position relationship between the selected unlock object and the locking zone, wherein the position relationship is one of a first relationship that the selected unlock object is located inside the margin of the locking zone, a second relationship that the selected unlock object is located at the margin of the locking zone, and a third relationship that the selected unlock object is located outside the margin of the locking zone. For example, there may be one or more, e.g. three, unlock objects corresponding to a specified function, e.g. normal displaying of the touch-sensitive display. Once one of the three unlock objects are touched so as to be selected, the other two will be hidden or idled. Subsequently, the position-correlating unit 622 compares an absolute value of an abscissa and an absolute value of an ordinate of the selected unlock object with an absolute value of a maximum one of abscissae and an absolute value of a maximum one of ordinates of the margin of the locking zone, respectively, to determine the position relationship.

The discriminating 631 determines whether the selected unlock object is located at any of a plurality of unlocking positions outside the corresponding locking zone, i.e. if the position relationship between the selected unlock object and the locking zone meets the third relationship. More specifically, the discriminating 631 determines if either of the absolute value of the abscissa and the absolute value of the ordinate of the unlock object is greater than the comparative one of the locking zone. If positive, it is determined that the unlock object is located in an unlocking zone outside the locking zone.

The touch-control-unlocking unit 632 unlocks the touch control for the function if the selected unlock object is located outside the locking zone due to being dragged to a position outside the locking zone or by touching the display at a desired position outside the locking zone.

The holding unit 633 keeps the function locked if no unlock object is selected, the selected unlock object is not located outside the corresponding locking zone, or the selected unlock object is not released.

Figure 7:
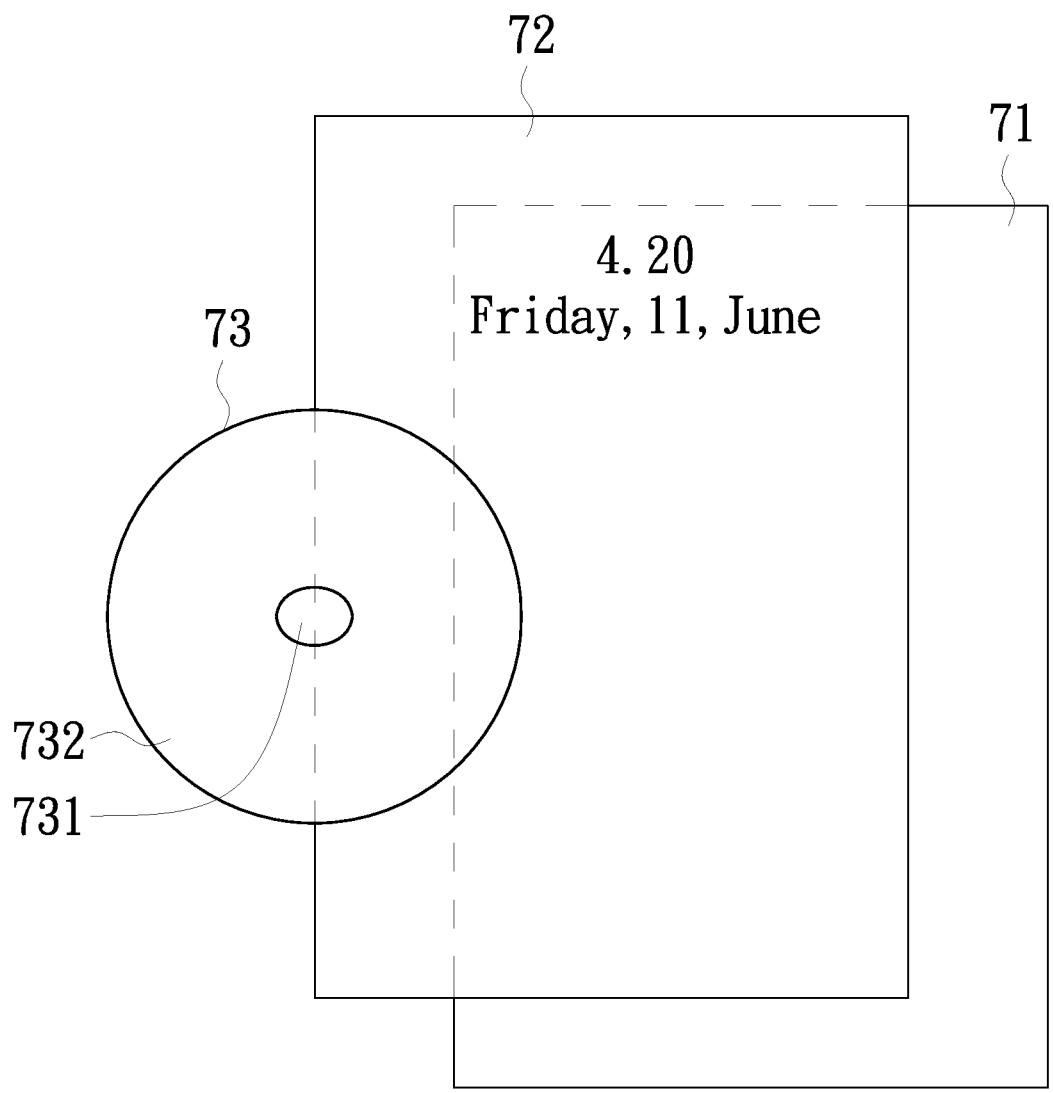
FIG. 7 is a diagram schematically illustrating configuration of a touch-sensitive display according to an embodiment of the present invention.

In an example of the present invention, the touch-sensitive display may be implemented with a three-tier architecture, as schematically illustrated in FIG. 7. The three tiers include a wallpaper tier 71, an information tier 72 and an unlocking control tier 73. The wallpaper tier 71 supports displaying of a wallpaper, and may be changed in real time. The information tier 72 supports displaying of time, a date, a message, a phone preview, etc., and may also be changed. The unlocking control tier 73 displays unlocking control means, including an unlock object 731 and a locking zone 732, and receiving associated operations. The locking zone 732 is exemplified and is not limited to a circle. The touch control terminal further includes a lock screen manager (not shown), which executes initialization and destruction of a lock screen interface. The three tiers are abstracted into a layout, and executed by the lock screen manager. The lock screen manager also supports replacement of a displayed style in each tier according to a layout and source data loaded from external storage means.

In an example, in the unlocking control tier 73, there are three displaying states of the unlock object(s) to be selectively shown, including a standby state, a selecting state and an unlocking state. First of all, the functions to be unlocked are initialized with corresponding configuration data, and recorded in a list. The information associated with each function to be unlocked includes center pixel data of each unlock object corresponding to the function to be unlocked; radius data of each corresponding locking zone; frame data of each unlock object in each of the three displaying states; and frame data of each locking zone. In an initial state, touch control for the function is locked and the unlock objects are all idled. It is defined to be in the standby state. At this moment, all the related data are initial data. Upon detecting that an unlock object is touched so as to be selected, a prompt animation will be displayed. This is in the selecting state. Meanwhile, the unselected unlock object(s) will be hidden or idled. In the selecting state, the selected unlock object is set to be movable. In response to the selection of unlock object, the corresponding locking zone is displayed for the user's reference for moving the selected unlock object. After the selected unlock object is moved outside the locking zone and released at one of a plurality of positions outside the locking zone, the unlocking state is entered. Otherwise, it remains in the selecting state or returns to the standby state. In the unlocking state, API is called to allow the function to be executed.

To sum it up, according to the present invention, it is detected if any of the at least one unlock object is selected. The selected unlock object is then tracked. When the selected unlock object is located at any of a plurality of unlocking positions outside the corresponding locking zone, touch control for a function corresponding to the selected unlock object is unlocked.

It is to be noted that in the above-described embodiments, all the units and modules are exemplarily classified based on functions. It is not intended to limit the classification of the units and modules to this manner as long as the corresponding functions can be achieved. Furthermore, the functional units are respectively named such that they can be clearly distinguished. The scope of the present invention is not limited thereto.

For those having ordinary skill in the art, it is understood that all or a part of the steps in the various embodiments described above can be executed by a program instructing relevant hardware, and the corresponding program may be stored in a computer readable storage object. The so-called storage object can be, for example, a ROM/RAM, disk or optical disk, etc.

What are described above are preferred embodiments according to the present invention only, rather than being used for limiting the present invention. On the contrary, it is intended to cover various modifications and similar arrangements included within the spirit and scope of the appended claims which are to be accorded with the broadest interpretation so as to encompass all such modifications and similar structures.

What is claimed is:

1. A method for unlocking touch control, performed by a touch control terminal, the touch control terminal having a touch-sensitive surface on which at least one unlock object and a locking zone corresponding to the at least one unlock object are defined, the method comprising steps of:
   detecting if any of the at least one unlock objects are selected;
   tracking the selected unlock object; and
   unlocking the touch control for a function corresponding to the selected unlock object when the selected unlock object is located at any of a plurality of unlocking positions outside the corresponding locking zone,
   wherein the step of tracking the selected unlock object includes:
   fetching information of the locking zone and information of the selected unlock object; and
   determining a positional relationship between the selected unlock object and the locking zone in accordance with the fetched information, wherein the positional relationship is one of a first relationship where the selected unlock object is located inside a margin of the locking zone, a second relationship where the selected unlock object is located at the margin of the locking zone, and a third relationship where the selected unlock object is located outside the margin of the locking zone.

2. The method according to claim 1, wherein the plurality of unlocking positions are in an unlocking zone, which surrounds the locking zone.

3. The method according to claim 1, wherein the information of the selected unlock object is a position coordinate of a geometric center or specified edge point of the selected unlock object, and the information of the locking zone is position coordinates of the margin of the locking zone.

4. The method according to claim 3, wherein the positional relationship between the selected unlock object and the locking zone is determined by comparing the position coordinate of the geometric center or specified edge point of the selected unlock object with the position coordinates of the margin of the locking zone, and the selected unlock object is detected to be outside the locking zone if the positional relationship between the selected unlock object and the locking zone meets the third relationship.

5. The method according to claim 1, wherein the touch-sensitive surface is a touch-sensitive display, and the unlock object is an unlock image movably shown on the touch-sensitive display.

6. The method according to claim 5, wherein the information of the selected unlock object is a pixel coordinate of a geometric center or specified edge point of the selected unlock object, and the information of the locking zone is pixel coordinates of the margin of the locking zone.

7. The method according to claim 6, wherein the positional relationship between the selected unlock object and the locking zone is determined by comparing the pixel coordinate of the geometric center or specified edge point of the selected unlock object with the pixel coordinates of the margin of the locking zone, and the selected unlock object is detected to be outside the locking zone if the positional relationship between the selected unlock object and the locking zone meets the third relationship.

8. The method according to claim 5, wherein the function to be unlocked is normal displaying of the touch-sensitive display, or execution of an application program of the touch control terminal.

9. The method according to claim 1, wherein the at least one unlock object includes only a single unlock object, which is operable to unlock the touch control for all functions of the touch control terminal.

10. The method according to claim 1, wherein the at least one unlock object includes a plurality of unlock objects, each of which corresponds to a specified function of the touch control terminal and is operable to unlock the touch control for at least the specified function.

11. The method according to claim 1, wherein the selected unlock object is the one located at a locked position and touched by a user.

12. The method according to claim 1, further comprising, between the detecting step and the tracking step, a step of realizing the locking zone to which the selected unlock object is corresponding.

13. The method according to claim 1, further comprising a step of keeping all functions locked if no unlock object is selected or the selected unlock object is not located outside the corresponding locking zone.

14. A device for unlocking touch control of a touch control terminal, comprising:
a correspondence-realizing unit configured to realize an unlock object and a locking zone, which correspond to a function to be unlocked;
an information-fetching unit configured to fetch information of the unlock object and information of the locking zone;
a position-correlating unit configured to determine a positional relationship between the unlock object and the locking zone in accordance with the fetched information, wherein the positional relationship is one of a first relationship where the unlock object is located inside a margin of the locking zone, a second relationship where the unlock object is located at the margin of the locking zone, and a third relationship where the unlock object is located outside the margin of the locking zone; and
a touch-control-unlocking unit configured to unlock the touch control for a function corresponding to the unlock object if the positional relationship between the unlock object and the locking zone meets the third relationship.

15. The device according to claim 14, wherein the information-fetching unit is a position-coordinate-fetching unit configured to fetch a position coordinate of a geometric center or specified edge point of the unlock object and position coordinates of a margin of the locking zone, and the position-correlating unit determines the positional relationship between the unlock object and the locking zone by comparing the position coordinate of the geometric center or specified edge point of the unlock object and the position coordinates of the margin of the locking zone.

16. The device according to claim 14, wherein the information-fetching unit is a pixel-coordinate-fetching unit configured to fetch a pixel coordinate of a geometric center or specified edge point of the unlock object and pixel coordinates of a margin of the locking zone, and the pixel-correlating unit determines the positional relationship between the unlock object and the locking zone by comparing the pixel coordinate of the geometric center or specified edge point of the unlock object and the pixel coordinates of the margin of the locking zone.

17. A touch control terminal, comprising:
a touch-sensitive display; and
a device for unlocking touch control of the touch control terminal, including:
a correspondence-realizing unit configured to realize an unlock object and a locking zone, which correspond to a function to be unlocked;
an information-fetching unit configured to fetch information of the unlock object and information of the locking zone;
a position-correlating unit configured to determine a positional relationship between the unlock object and the locking zone in accordance with the fetched information, wherein the position relationship is one of a first relationship that the unlock object is located inside a margin of the locking zone, a second relationship that the unlock object is located at the margin of the locking zone, and a third relationship that the unlock object is located outside the margin of the locking zone; and
a touch-control-unlocking unit configured to unlock the touch control for a function corresponding to the unlock object if the positional relationship between the unlock object and the locking zone meets the third relationship.

\* \* \* \* \*